United States Patent [19]

Gardner

[11] 4,020,234

[45] Apr. 26, 1977

[54] HIGH-ALUMINA CONTENT COMPOSITIONS CONTAINING BAO-MGO-$SIO_2$ GLASS AND SINTERED CERAMIC ARTICLES MADE THEREFROM

[75] Inventor: Richard A. Gardner, Wappingers Falls, N.Y.

[73] Assignee: International Business Machines Corporation, Armonk, N.Y.

[22] Filed: Nov. 7, 1975

[21] Appl. No.: 629,811

Related U.S. Application Data

[62] Division of Ser. No. 430,329, Jan. 2, 1974, Pat. No. 3,935,017.

[52] U.S. Cl. .............................. 428/433; 428/325; 428/329; 428/303; 428/331; 428/434; 428/446; 428/539

[51] Int. Cl.[2] ........................................ B32B 27/40

[58] Field of Search .................... 106/46, 52, 73, 4; 428/325, 329, 330, 331, 433, 434, 471, 472, 446, 539

[56] References Cited

UNITED STATES PATENTS

| | | | |
|---|---|---|---|
| 2,760,875 | 8/1956 | Schwartzwalder et al. | 106/46 |
| 3,019,116 | 1/1962 | Doucette | 106/46 |
| 3,167,438 | 1/1965 | Bristow | 106/46 |
| 3,238,048 | 3/1966 | Somers | 106/46 |
| 3,501,322 | 3/1970 | Dumbaugh, Jr. et al. | 106/46 |

OTHER PUBLICATIONS

Phase Diagrams for Ceramists, Levin et al, eds., 1969 Supplement, p. 127, Fig. 2458, Am. Cer. Soc., Inc., (1969).

Kaiser et al., "A Fabrication Technique for Multilayer Ceramic Modules," Solid State Technology/May 1972. pp. 35–40.

*Primary Examiner*—Marion E. McCamish
*Attorney, Agent, or Firm*—Sughrue, Rothwell, Mion, Zinn & Macpeak

[57] ABSTRACT

The compositions of the present invention comprise alumina and minor proportions of a ternary glass sintering aid from the system: BaO-MgO-$SiO_2$. The compositions can be sintered in a reducing atmosphere to provide ceramics which find particular utility in electrical devices, e.g., in multilayer ceramic sandwiches. The compositions are particularly amenable to formation by doctor blade slip casting techniques.

9 Claims, 1 Drawing Figure

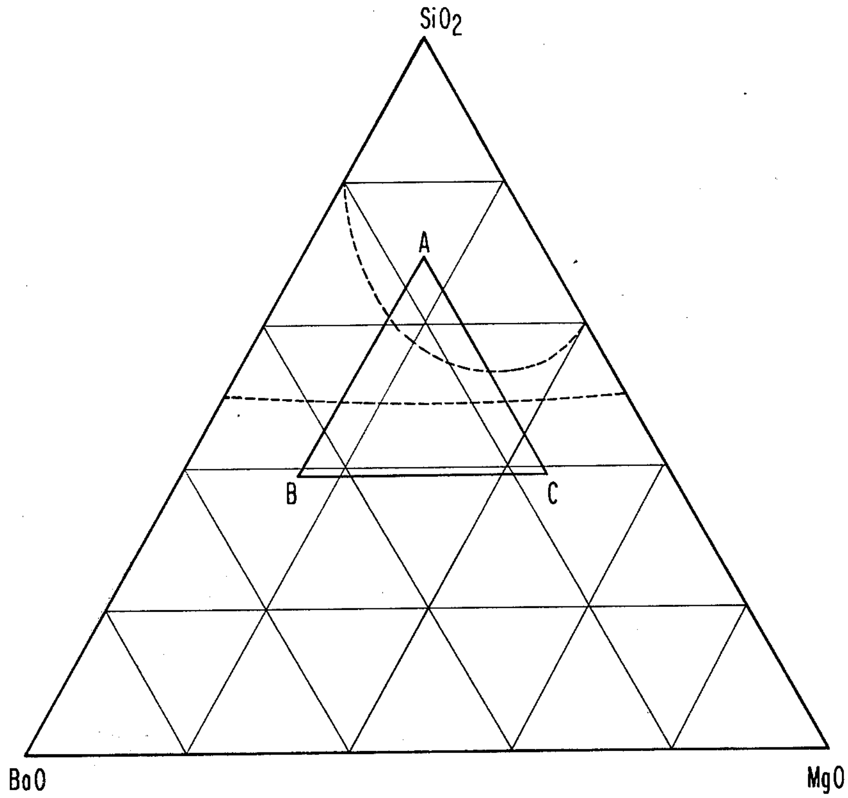
SiO2
A
B
C
BaO
MgO

HIGH-ALUMINA CONTENT COMPOSITIONS CONTAINING BAO-MGO-SIO$_2$ GLASS AND SINTERED CERAMIC ARTICLES MADE THEREFROM

This is a division of application Ser. No. 430,329 filed Jan. 2, 1974, now U.S. Pat. NO. 3,935,017.

BACKGROUND OF THE INVENTION

1. Field of the Invention

The present invention relates to high alumina content ceramic compositions, sintered ceramics formed therefrom and to processes for manufacturing the same.

2. Description of the Prior Art

One recent advance in electronics packaging to meet microminiaturization demands in the art has been developed of multilayer ceramic sandwiches; as are described in "Laminated Ceramics," Proc. Electron. Comp. Conf. (Washington, D.C., 1967), page 17; "Ceramics for Packaging", Solid State Technology, 14, 1971, page 40; "A Fabrication Technique for Multilayer Ceramic Modules," Solid State Technology, May 1972, page 35; and "Metal-Ceramic Constraints for Multilayer Electronic Packages", Proceedings of the IEEE, 59, 1455 (1971).

Multilayer ceramic sandwiches find particular usage in computer circuitry, and accordingly stringent requirements are posed thereon both from a processing viewpoint and from the viewpoint of final device requirements.

For instance, multilayer ceramic sandwiches usually comprise a plurality of ceramic substrates in combination with internal metallization, the combination having been sintered at elevated temperatures, especially in the range of 1,400°–1,700° C. Metallurgy having a melting point higher than the sintering temperature is generally used, typically refractory metals such as molybdenum or tungsten. However, the refractory metals require the use of reducing ambients during sintering and critical process control since the partial pressure of oxygen must be maintained low enough during sintering to prevent oxidation of the metal and yet must not be so low that silica present in the ceramic is extensively reduced. Further, the use of refractory metals has also necessitated stringent controls on the physical properties of the ceramic used so that mechanical failure of the ceramic does not occur, for instance, due to stresses arising from thermal expansion mismatches between the metallurgy and the ceramic.

Further, under such a reducing ambient, prior art ceramic materials often blister or mottle, unless the particle size of the starting ceramic is critically controlled.

U.S. Pat. No. 3,020,619 Koch discloses forsterite ceramic compositions having as the major crystalline phase $2MgO{\cdot}SiO_2$. The material is made synthetically from, for example, Montana talc, fused MgO, potash feldspar, Kentucky Special ball clay and precipitated $BaCO_3$.

U.S. Pat. No. 3,480,452 Fleischner, et al. disclose a method of making void free crystalline-glass ceramic materials from two frits, one being a thermally crystalline $MgO\text{-}Al_2O_3\text{-}SiO_2$ glass and the other phase being 10-30% of a bonding frit of the formula: $MgO\text{-}CaO\text{-}BaO\text{-}Al_2O\text{-}SiO_2$, the resultant body containing a cordierite crystalline phase.

U.S. Pat. No. 3,489,627 Botden, et al. disclose a bonding composition and a method for bonding using the same, the bonding composition being substantially composed of CaO, BaO and/or $SiO_2$, to which MgO, SrO and/or $Al_2O_3$ may be added, in which case the proportion of $Al_2O_3$is at most 75% by weight.

U.S. Pat. No. 3,615,763 Flock relates to sintered ceramic articles useful as electrical insulators consisting essentially of a reaction product which, calculated as oxides, is approximately 94–96.5 wt. % $Al_2O_3$ and a mixture of $SiO_2$, CaO and MgO.

U.S. Pat. No. 3,631,131 Kopko discloses a method for reconstituting unfired, cast alumina scrap wherein $Al_2O_3$ can be blended with $SiO_2$, $MgCO_3$, $CaCO_3$ and a binder such as polyvinyl butyral to form a firing charge.

U.S. Pat. No. 3,698,923 Stetson, et al. disclose a fired alumina ceramic material which can comprise 96% $Al_2O_3$, 2% $CaSiO_3$ and 2% $MgSiO_3$, fired at 1500° C.

Miller et al. in Ceramic Bulletin, Vol. 48, No. 8 (1969), page 786, disclose $BaO\text{-}Al_2O_3\text{-}SiO_2$ glasses, and discuss the same in detail.

Floyd, *Journal of the American Ceramic Society*, Vol. 47, No. 11, November 21, 1964, discusses the effect of secondary crystalline phases on dielectric losses in high-alumina bodies, and concludes that the presence of one of the three feldspars, $BaO{\cdot}Al_2O_3{\cdot}2SiO_2$, $CaO{\cdot}Al_2O_3{\cdot}2SiO_2$ or $SrO{\cdot}Al_2O_3{\cdot}2SiO_2$ cause high dielectric losses when present in high-alumina bodies.

Goodyear, et al. in the *Ceramic Bulletin*, Vol. 45, No. 8 (1966), pages 706, et seq., present an investigation of the $CaO\text{-}Al_2O_3\text{-}SiO_2$ system. This reference relates to the formation of "vitrified" ceramics such as cordierite or anorthite. Special glass frits are added as batch constituents, along with other raw materials, to yield desired overall compositions of the exact compositions of the phases such as anorthite or cordierite. The composition of anorthite, and the final composition of the ceramic in Goodyear, et al., is $CaO{\cdot}Al_2O_3{\cdot}2SiO_2$. The present application relates to the formation of high alumina ceramics with properties completely different from the properties of vitrified ceramics such as anorthite.

Caldwell and Gdula have suggested the addition of baria, magnesia and silica to alumina as fluxing agents. However, the prior art believed that a silica:alkaline earth ratio of 1.5:1 was needed to render such bodies impervious to water (low porosity). Such compositions fall within the "two liquid region" for the baria-magnesia-silica system and illustrate a tendency to phase separation. The best of such compositions had the following analysis: $Al_2O_3$ 91%; $SiO_2$ 5.60% MgO 1.90%; BaO 1.50%; F 1.06%. Caldwell and Gdula indicate that glass prepared from components of the system $BaO\text{-}MgoSiO_2$ can be used to fabricate ceramic bodies which densify to negligible water absorption if the silica:alkaline earth ratio in the glass is 1.5:1, the ceramic is made from 4 $\mu$ $Al_2O_3$ and is fired in air. In reducing ambients and with different particle size aluminas the behavior of the glass fluxing aids are much different and compositions different from those indicated were found to be most useful in accordance with the present invention. In addition, the best composition in Caldwell and Gdula was one containing fluoride. This type of glass is not useful in hydrogen sintering ambients.

The prior art has also suggested a glass sintering aid for alumina containing four components $Al_2O_3$, CaO, MgO and $SiO_2$. Such ceramics are extremely susceptible to blistering during sintering and occasional mottling on the surface of the sintered ceramic also occurs.

To obtain good glass sintering aid qualities, it is further necessary to have appreciable percentages of $TiO_2$, $Fe_2O_3$, $Na_2O$ and $K_2O$.

SUMMARY OF THE INVENTION

It is one object of the present invention to provide high alumina content ceramic compositions which can be sintered in a reducing or an oxidizing atmosphere.

It is a further object of the present invention to provide high alumina content ceramic compositions which are not subject to blistering or mottling when sintered in a reducing atmosphere.

Still yet a further object of the present invention is to provide high alumina content ceramic compositions which, subsequent to sintering, have extremely smooth surface topography.

A further object of the present invention is to provide high alumina content ceramic compositions which are compatible with refractory and noble metallurgy.

A further object of the present invention is to provide sintered high alumina content ceramic compositions which densify to less than 5% porosity and substantially 0% water absorption.

Yet another object of the present invention is to provide high alumina content ceramic compositions which can be used to form multilayer ceramic sandwiches suitable e.g., in computer circuitry.

These and other objects of the present invention are provided by high alumina content ceramic compositions which comprise alumina and a ternary glass sintering aid from the system: BaO-MgO-$SiO_2$.

BRIEF DESCRIPTION OF THE DRAWING

The drawing is a ternary phase diagram for the BaO-MgO-$SiO_2$ system.

DETAILED DESCRIPTION OF THE INVENTION

Although it will be clear to one skilled in the art that the high alumina content ceramic compositions of the present invention can be used in any environment where the properties heretofore enumerated are desired, the following discussion will be given with reference to the formation of a multilayer ceramic sandwich where the high alumina content ceramic composition of the present invention finds particular application.

Further, since the ceramic elements of a multilayer ceramic sandwich are most profitably formed by doctor blade slip casting techniques (hereinafter "slip casting"), the following discussion will be in terms of ceramic compositions adapted for such techniques. It should be understood, however, that other techniques such as extrusion, pressing techniques, calendering and the like can be used, if desired.

Slip casting generally involves the steps of casting slip formation (ceramic/temporary binder/solvent system), casting onto a substrate to form a "green sheet", and binder removal/sintering to volatilize binder/solvent and densify the ceramic, followed by appropriate final device fabrication steps, as will later be explained in detail.

That alumina used in the present invention is of high purity, i.e., of a purity of about 95 wt. % alpha-$Al_2O_3$ or higher. Impurities such as sodium oxide tend to lower the dissipation factor and the dielectric constant of sintered ceramic articles obtained from the composition of the present invention, and it is most preferred that alumina of a purity of 99.5 wt. % or higher be used.

It is important that the particle size of the alumina be appropriately selected to enable a slip casting composition of an appropriate viscosity to be obtained. Usually, the alumina will have a particle size of from about 0.2 microns to about 10 microns, with alumina of a particle size of 3 to 4 microns being most preferably used.

If alumina of a particle size substantially lower than 0.2 microns is used, the viscosity of a slip casting composition formed therefrom will often be too high, causing the slip casting composition formed therefrom to assume a rubbery character and making slip casting extremely difficult, unless excessive amounts of solvent are added. Excessively small alumina particles also have a tendency to decrease the density of a green sheet formed therefrom due to poor particle packing. High amounts of binder become necessary, which consequently leads to high and poorly controllable shrinkage and to low green sheet permeability, causing disruption of the multilayer sandwich.

On the other hand, if the size of the alumina is substantially in excess of about 10 microns, the viscosity of the slip casting composition will often become too low and cracks and craters will result in green sheets formed therefrom. Further, excessively large alumina is difficult to density except at temperatures too high for the glassy phase to withstand. The ceramics become "overfired" before they are completely dense.

It is most preferred that the surface area of the alumina be less than about 18 $m^2/gm$, more preferably less than 15 $m^2/gm$, since this will permit preferred amounts of organic binder to be used in forming the slip cast composition. Excessive amounts of binder can lead to excessive linear shrinkage during sintering.

An important consideration in forming the high alumina content ceramic compositions of the present invention is the ratio of alumina to the ternary glass sintering aid. With alumina of a larger particle size, lesser amounts of alumina can be used, while with alumina of smaller particle size, greater amounts of alumina are required. For example, with alumina having a particle size of 4 microns or greater one can use as little as 80 to 85 wt. % alumina, whereas with alumina having a smaller particle size, e.g., less than 1 micron, at least about 90% alumina should be utilized in the ceramic composition of the present invention. A typical composition in accordance with the present invention for alumina of a particle size of 3 to 4 microns will be 89 wt. % of alumina and 11 wt. % of the ternary glass sintering aid.

In some cases, it may be necessary to use an alumina powder with an average particle size less than one microns in order to achieve a smooth surface finish of the sintered ceramic. Aluminas with such small particle size can usually be sintered to greater than 98% theoretical density without the addition of a glass sintering aid. Such unfluxed alumina ceramics, however, are not compatible with internal refractory metals due to the thermal expansion mismatch between the ceramic and metal. The addition of a glass sintering aid in accordance with the present invention to the alumina can make the ceramic and metal compatible. All prior art glasses caused blistering at the ceramic when submicron alumina was used. This occurs due to rapid sintering of the ceramic and entrapment of volatiles from the ceramic (such as volatile SiO from reduced $SiO_2$). The ternary glass sintering aids of the present invention do not cause blistering and overfiring with submicron aluminas and therefrom permit the use of refractory metals.

The ternary glass sintering aids of the present invention with permit the objects of the present invention to be reached will not be discussed in detail.

$BaO-MgO-SiO_2$ ternary glass sintering aids as can be used in the present invention have the compositions represented by the area A-B-C of the ternary phase diagram shown in the attached drawing.

A-B-C are at the following compositions:

| Point | Mol % BaO | Mol % MgO | Mol % $SiO_2$ |
|---|---|---|---|
| A | 15.0 | 15.0 | 70.0 |
| B | 43.5 | 17.5 | 39.0 |
| C | 17.5 | 43.5 | 39.0 |

The sintered ceramics resulting from the high alumina ceramic compositions of the present invention, which contain a ternary glass sintering aid from the system described above, meet all of the requirements of multilayer ceramic sandwiches. They are chemically inert and thermally stable. They have high electrical resistance, for instance $10^{14}$ ohm/cm or higher, and thus serve as an excellent insulator in circuit components. They have high mechanical strength, for example, 40,000 psi or greater, and thus are extremely resistant to breakage. They can be fired to an extremely smooth surface finish, for instance, 5–20 microinches, thereby providing a high degree of film uniformity for surface metallurgy. They illustrate a very low porosity, below approximately 0.1% maximum. They have a very low dielectric constant, for instance, equal to or less than 9.5 thereby permitting reasonable circuit speeds when utilized in computer circuitry. In combination with a low dielectric constant, they have a low dissipation factor, for instance, less than approximately 0.005, whereby electrical leakage is prevented.

Very importantly, they are stable in reducing atmospheres and can be co-sintered with non-precious refractory metals such as molybdenum and tungsten, and are not subject to substrate cracking or warping during sintering with such relatively inexpensive metals.

Having established the identity of the components of the high alumina ceramic composition of the present invention and the ratio thereof, it is appropriate to turn to one preferred processing sequence utilized to form multilayer ceramic sandwiches from compositions in accordance with the present invention.

The first procedural step in accordance with the present invention is generally to blend the alumina and ternary glass sintering aid, both in particulate form. This can be accomplished in, for example, a ball mill or equivalent apparatus. Since alumina is much harder than the ternary glass sintering aid of the present invention, generally ball milling is conducted for a time sufficient to reduce the glass to the size of the alumina. So as to avoid excessive ball milling times, usually the glass will have a size of 200 mesh or smaller, more preferably, 325 mesh or smaller (about 44–50 microns), prior to ball milling. Ball milling is continued to reduce the glass to a size on the order of that of alumina. i.e., 0.2 to 10 microns.

The alumina and glass particles can be ball milled alone and subsequently blended with an organic binder, solvent, etc., to provide the slip casting composition, or, if desired, at this stage the solvent and resin binder used to form the slip casting composition can be added and the resulting composition ball milled to directly provide the desired slip casting composition.

Representative of the slip casting compositions (as can be used) are those disclosed in R. E. Mistler, Bull. Am. Ceramic Soc., Vol. 92(11), pages 850–854 (1973); H. D. Kaiser, et al., Solid State Technology, May 1972, page 35; and U.S. Pat. No. 2,966,719 Parks.

The exact identity of the resin binder and solvent components of the slip casting composition is not overly critical. In commercial scale operations, the slip casting composition is formed to have a viscosity of from about 500 to about 5,000 cps to provide excellent slip casting capability. While higher and lower viscosities are acceptable, when the viscosity is substantially lower than about 500 cps, for example on the order of 200 cps, the slip casting composition will have a tendency to be too thin to be easily worked, and at viscosities greatly in excess of 5,000 cps the slip casting composition becomes too thick to be easily worked.

Usually the particulate alumina plus particulate ternary glass sintering aid will comprise from about 25 wt. % to about 75 wt. % of the slip casting composition (viscosity is the most important criterion), with the balance comprising conventional solvents, binders, plasticizers and like components.

The resulting slip casting composition is then cast utilizing a doctor blade or equivalent technique onto a substrate, for instance, a sheet of Mylar. The thickness of the green sheet will obviously depend upon user requirements, and a common sense approach is used. The green sheet is generally sufficiently thick so that it can be easily handled but is not so thick that volatiles and binder removal will be hindered. For instance, in forming green sheets which are to be later laminated to form a multilayer ceramic sandwich, typically thicknesses on the order of 0.006 to about 0.012 inches are used.

The green sheet is then dried using any conventional technique, for instance, infrared heating, hot plates or the like. Air drying is most economically used.

Most preferably, the green sheet density after drying is from about 2.00 to about 2.30 g/cm$^3$, but as later shown these are not mandatory bounds.

If desired, at this stage the dry green sheets can be metallized using standard techniques, through or via holes in the Z direction punched using standard techniques such as with mechanical punches or with high energy optical or electron beams, and the green sheets then laminated to provide good intersheet bonding. The exact conditions of lamination are not overly critical. If the sheet is sufficiently thick, obviously it need not be laminated and can be used per se.

One substantial advantage of the high alumina ceramic composition of the present invention is that it can be sintered in a reducing gas atmosphere without blistering or mottling.

Reducing gas atmosphere as are typically used in the art are effective in the present invention, with illustrative examples being hydrogen gas or cracked ammonia. It is generally desirable to sinter under conditions that provide less than 5% porosity in the ceramic article formed. Usually, sintering temperatures on the order of 1,300° to 1,600° C. are used, as these elevated temperatures can provide greater than 90% theoretical density. Holding times at the sintering temperatures are in accordance with techniques used in the art, and are typically on the order of 3 hours. The greatest amount of sintering occurs in the first hour and sintering becomes inefficient after about 3 hours, although sintering times longer than 3 hours are not harmful.

An oxidizing atmosphere can be used for the sintering, if desired, of course. Temperatures and times are equivalent to those used for the reducing atmosphere sintering heretofore discussed.

Having thus described the present invention in general, the following specific examples are offered to illustrate preferred modes of practicing the present invention.

EXAMPLES

The following ternary glass sintering aid compositions in accordance with the present invention were formed:

| Glass Comp. No. | Wt. %(Mol. %) BaO | Wt. % (Mol. %) MgO | Wt. % (Mol. %) $SiO_2$ |
|---|---|---|---|
| G1 | 47.7 (25.0) | 7.5 (15.0) | 44.8 (60.0) |
| G2 | 48.9 (25.0) | 12.8 (25.0) | 38.3 (50.0) |

The aluminas used in this Example had the following compositions:

| | Wt. % $Na_2O$ | Particle Size (microns) | Purity (wt. % alpha-$Al_2O_3$) | Surface Area |
|---|---|---|---|---|
| $Al_2O_3$ No. 1 | .04 | 1.4 | 99.7 | <15 $m^2$/gm |
| $Al_2O_3$ No. 2 | .04 | 4.0 | 99.6 | <15 $m^2$gm |
| $Al_2O_3$ No. 3 | .08 | 0.5 | 99.6 | <15 $m^2$gm |
| $Al_2O_3$ No. 4 | .01 | 1.0 | 99.98 | <15 $m^2$gm |

Ternary glass sintering aids G1 and G2 were prepared by melting the requisite reagent grade oxides or carbonates in a platinum crucible using R-F heating. The resulting molten glass was poured into water to render it friable and then ground in an alumina ball mill with deionized water to a size of 325 mesh (less than 44 microns), thereafter being dried at 140° C.

The ceramic/vehicle formulation for all samples was the same as shown below (approximate):

| | |
|---|---|
| Ceramic ($Al_2O_3$ + Glass)* | 66.7% |
| Butvar (B-98; polyvinyl butyral) | 3.8% |
| Dioctylphthalate (plasticizer for the polyvinyl butyral) | 1.9% |
| Methanol | 5.3% |
| Toluene | 7.9% |
| Cyclohexanone | 14.3% |

*The proportions of alumina:glass are given in the Table.

The samples were formed by ball milling the ceramic/vehicle combination for 12 hours to directly yield the slip casting composition. The slip casting composition thus formed was cast by doctor blading into sheets 6 inches wide by 0.006–0.008 inches thick on a Mylar substrate using standard techniques.

The sheets were then dried in air for 24 hours to remove volatile solvents and then stripped from their Mylar carrier and blanked into 4/4 inch sheets.

For purposes of simplicity, metallurgy/via hole formation was not conducted. If such had been performed, it would generally be done at this stage.

Ten of the resulting sheets were stacked together and laminated at 95° C., 2600 psi for 10 minutes.

The laminated samples were then sintered in hydrogen in an elevatorhearth type furnace. The dew point of the hydrogen ambient in the furnace was maintained at 30° C., with sintering being at 1560° C. with a 3 hour hold at that temperature. All remaining non-ceramic components were volatilized during sintering. The substrate was elevated from ambient temperature to the sintering temperature at 200°–250° C. per hour.

The following samples were prepared as above (matter in parentheses is parts by weight of the components):

| | | |
|---|---|---|
| Sample 1 | $Al_2O_3$ No. 1 (90) + G1 | (10) |
| Sample 2 | $Al_2O_3$ No. 2 (90) + G1 | (10) |
| Sample 3 | $Al_2O_3$ No. 3 (95) + G2 | (5) |
| Sample 4 | $Al_2O_3$ No. 4 (95) + G2 | (5) |
| Sample 5 | $Al_2O_3$ No. 1 (95) + G1 | (5) |

The properties of the sintered materials resulting from Samples 1 and 2 are given below.

| | Surface Finish ($\mu$ in) | Dielectric Constant | Dissipation Factor |
|---|---|---|---|
| Sample 1: | 21 | 9.30 | 0.00278 |
| Sample 2: | 33 | 9.20 | 0.00108 |

In the green sheet stage the Samples exhibited the following properties:

| | Viscosity (cps) | Density (g/cm³) |
|---|---|---|
| Sample 1 | 1100 | 2.27 |
| Sample 2 | 1420 | 2.04 |

Sample 3 was examined for different properties, since with prior art sintering aids submicron alumina such as $Al_2O_3$ No.3 would show poor density, porosity and blistering if sintered at 1,560° C. However, the BaO-MgO-$SiO_2$ sintering aid of the present invention provided a ceramic which showed zero water absorption, did not blister (even at 1,600° C.) and had densities in the range of 3.6~3.7 g/cm³ (at 1530°–1560° C. sintering, respectively).

Sample 4 was examined primarily for density results, and this highly pure, low alumina size ceramic was found to sinter to densities of 3.70–3.75 g/cm³ in the area of 1,560° C.

The most superior samples from the viewpoint of density was Sample 5, while illustrated a density of 3.80–3.84 g/cm³ with sintering at 1560°–1600° C.

The above sintered ceramics were excellent for the fabrication of multilayer ceramic sandwiches.

While the invention has been particularly shown and described with reference to the preferred embodiment thereof, it will be understood by those skilled in the art that various changes in form and details may be made therein without departing from the spirit and scope of the invention.

What is claimed is:

1. In a sintered multilayer ceramic sandwich comprising a plurality of ceramic layers separated by internal conductive metallization, the improvement wherein said ceramic layers consist essentially of a sintered alumina and material sinterable in a reducing atmosphere without blistering or mottling consisting essentially of alumina and a pre-fused ternary glass sintering aid from the system:

BaO-MgO-$SiO_2$ said sintering alumina ceramic material having a dielectric constant of at most 9.5, which permits adequate speeds upon use in computer circuitry, and a dissipation factor less than 0.005, said ternary glass sintering aid being selected from compositions within the area bounded by A-B-C in the Figure, which points A-B-C represent the following compositions:

| Point | Mol % BaO | Mol % MgO | Mol % $SiO_2$ |
|---|---|---|---|
| A | 15.0 | 15.0 | 70.0 |
| B | 43.5 | 17.5 | 39.0 |
| C | 17.5 | 43.5 | 39.0 |

2. The sintered multilayer ceramic sandwich of claim 1 containing at least 80 wt. % alumina.

3. The sintered multilayer ceramic sandwich of claim 2 containing at least 90 wt. % alumina.

4. The sintered multilayer ceramic sandwich of claim 3 where the alumina is at least 99.5 wt. % alpha-alumina.

5. The sintered multilayer ceramic sandwich of claim 2 where the alumina is at least 95 wt. % alpha-alumina.

6. The sintered multilayer ceramic sandwich of claim 5 where the alumina has a particle size of 3 to 4 microns.

7. The sintered multilayer ceramic sandwich of claim 5 where the alumina has a surface area of less than 15 $mg^2/g$.

8. The sintered multilayer ceramic sandwich of claim 1 where the alumina has a particle size of about 0.2 to about 10 microns.

9. The sintered multilayer ceramic sandwich of claim 1 where the alumina has a surface area of less than about 18 $m^2/g$.

* * * * *

UNITED STATES PATENT AND TRADEMARK OFFICE

CERTIFICATE OF CORRECTION

PATENT NO. : 4,020,234

DATED : April 26, 1977

INVENTOR(S) : Richard A. Gardner

It is certified that error appears in the above-identified patent and that said Letters Patent are hereby corrected as shown below:

IN THE SPECIFICATION:

Column 1, lines 16-17, after "been" delete "developed" and insert --the development-- lines 62-63, delete "crystalline" and insert --crystallizable--

Column 2, line 4, delete "$Al_2O_3$is" and insert -- $Al_2O_3$ is -- line 24, delete "Cao" and insert -- CaO -- line 52, delete "Mgo" and insert -- MgO - -- line 65, after "components" insert -- : --

Column 3, line 62, delete "That" and insert -- The --

Column 4, line 53, delete "crons" and insert --cron-- line 53, delete "of" and insert --on--

Column 5, line 4, delete "with" and insert --which-- line 5, delete "not" and insert --now--

Column 6, line 58, delete "atmosphere" and insert --atmospheres--

Column 7, line 68, delete "elevatorhearth" and insert --elevator-hearth--

Column 8, line 49, delete "while" and insert --which--

UNITED STATES PATENT AND TRADEMARK OFFICE
CERTIFICATE OF CORRECTION

PATENT NO. : 4,020,234

DATED : April 26, 1977

INVENTOR(S) : Richard A. Gardner

It is certified that error appears in the above-identified patent and that said Letters Patent are hereby corrected as shown below:

IN THE CLAIMS:

Column 10, line 13, delete "$mg^2/g$" and insert -- $m^2/g$ --

Signed and Sealed this

*twenty-sixth* Day of *July 1977*

[SEAL]

*Attest:*

RUTH C. MASON
*Attesting Officer*

C. MARSHALL DANN
*Commissioner of Patents and Trademarks*